United States Patent [19]

Bono et al.

[11] 3,925,099
[45] Dec. 9, 1975

[54] FUEL CELL WITH A DECARBONATION CYCLE, CONSUMING A MIXED FUEL

[75] Inventors: Pierre Bono, Morangis; Philippe Demange, Chatenay Malabry; Claudine Leclere, Antony; Alexis Tissier, St. Michel-sur-Orge, all of France

[73] Assignee: Societe Generale de Constructions Electriques et Mecaniques "Alsthom & Cie", Paris, France

[22] Filed: Jan. 16, 1975

[21] Appl. No.: 541,595

[30] Foreign Application Priority Data
Jan. 28, 1974   France .............................. 74.02689

[52] U.S. Cl. .............................. 136/86 C; 136/86 R
[51] Int. Cl.² .......................................... H01M 8/04
[58] Field of Search ........................ 136/86 R, 86 C

[56] References Cited
UNITED STATES PATENTS
3,511,713   5/1970   Warzowski ....................... 136/86 R
3,703,416   11/1972   Jacquelin ....................... 136/86 R

*Primary Examiner*—John H. Mack
*Assistant Examiner*—H. A. Felley
*Attorney, Agent, or Firm*—William R. Woodward

[57] ABSTRACT

The invention consists in injecting a formate into the carbonated electrolyte going from the power section of a methanol-air primary battery to the decarbonation section thereof, in a quantity such that formate ions thus generated jointly with the formate ions formed in the power section by oxidation of methanol ensure the decarbonation of the electrolyte in the decarbonation section of the battery and make it possible to obtain a maximum value of the ratio between the reaction surfaces of the power section and the decarbonation section of the primary cell. More particularly, in certain cases, the injection of methyl formate makes it possible to obviate the separate injecting of methanol and of a formate.

8 Claims, 3 Drawing Figures

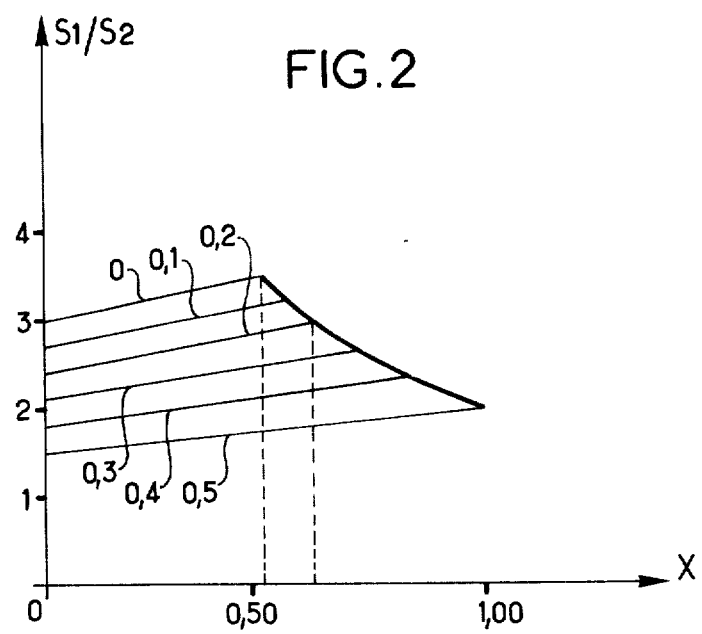
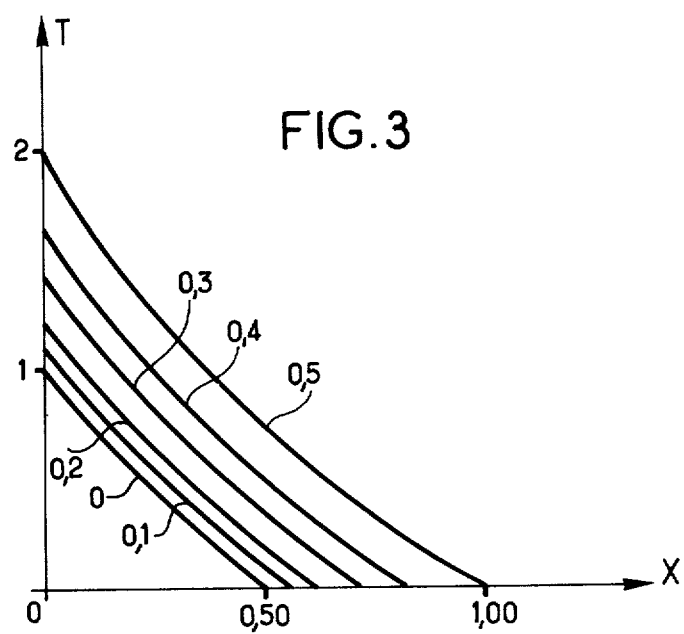

FUEL CELL WITH A DECARBONATION CYCLE, CONSUMING A MIXED FUEL

The present invention concerns a fuel cell implementing a mixed fuel combustion and decarbonation cycle and, more particularly, a cell in which methanol is used as fuel and oxygen or air is used as a combustion supporting material.

It is known that the problem of the carbonation of an alkaline electrolyte of a fuel cell is one of the most serious which has been encountered to date in the introduction of fuel cells into industrial practice on a commercial scale.

Indeed, in a fuel cell for industrial applications, that is, consuming oxygen in the air, and, directly or indirectly, a carbonaceous fuel, is subject to the introduction of carbonic acid into the cell from various sources: on the one hand, air contains a certain proportion of carbon dioxide and, on the other hand, the direct use of a carbonaceous fuel such as methanol gives carbonic acid as a reaction product.

The carbonic acid thus produced carbonates the alkaline electrolyte rapidly and finishes by completely transforming the latter into a carbonate solution, this resulting, in the majority of batteries, in collapse of their performance.

Methods making it possible to effect a continuous or intermittent decarbonation of the electrolyte have, of course, been sought for a long time. Many of these require more energy than the battery produces. Certain of them require auxiliary reactive agents as well as extra devices. A method which is considered as being one of the most satisfactory consists in adding, in a continuous or intermittent way, a base such as lime which causes formation of an insoluble carbonate. However, besides the necessity of injecting that base suitably, that method makes it necessary to store lime as well as fuel and requires complex and voluminous auxiliary elements.

Another method consists in connecting with the battery proper an electrolysis cell whose anode and cathode compartments are separated by a cationic membrane. By applying a sufficient voltage between the two electrodes of that cell, the K+ cations of the carbonated potassium hydroxide solution extracted from the battery and inserted in the cell will pass through the membrane under the influence of the electric field, while at the anode, oxygen and carbon dioxide will be evolved and at the cathode hydrogen will be evolved by electrodialysis. The potassium carbonate solution is transformed into potassium hydroxide, but the energy of the electrolysis of the water is added to the energy required by that transformation.

That extra expense of energy must be avoided either by consuming the hydrogen and the oxygen produced, in an auxiliary battery or by using two identical reversible electrodes and reversing their functions periodically. In any case, the method causes losses due to overvoltage at the electrodes and to the ohmic drop in the electrodialysis cell and, contingently, similar losses in the auxiliary battery.

Moreover, the electrodialysis cell and, contingently, the auxiliary battery constitute supplementary elements distinct from the battery itself.

The aim of the present invention is to overcome the previously mentioned disadvantages and it has as its object a fuel cell and, more particularly, a methanol-air cell suitable for effecting continuously and automatically the decarbonation of the basic electrolyte brought into play, with a high output and a minimum cost price.

The subject matter of the invention is, therefore, a method for the decarbonation of the alkaline electrolyte of a fuel cell of the type comprising two main portions, a first portion called the power section and a second portion called the decarbonation section, the said power section comprising an anode as well as a cathode separated by a membrane limiting an anode compartment and a cathode compartment, the said decarbonation section comprising also an anode as well as a cathode separated by a membrane limiting an anode compartment and a cathode compartment, the said cathodes both being fed an oxygenated combustion supporting material, the said anode compartment of the power section of the battery being fed with the said alkaline electrolyte and with a carbonaceous fuel, and the said anode compartment of the decarbonation section of the battery being fed with the said carbonated alkaline electrolyte coming from the said anode compartment of the said power section. The aforesaid method of the invention is characterized in that at least one compound suitable for supplying formate ions, when in contact with that carbonated electrolyte, is injected in the said carbonated alkaline electrolyte coming from the said anode compartment of the power section, the proportion of the said compound thus injected in relation to the carbonated fuel being such that the sum of the quantity of formate ions resulting from the said compound and of the quantity of formate ions formed by oxidation of the said carbonaceous fuel in the anode compartment of the power section of the battery ensures the complete decarbonation of the said alkaline electrolyte. The formate ion content is preferably maintained at a value which, for the particular membrane used, minimizes the decarbonation section of the battery relative to the reaction surface of the power section of the battery.

The subject matter of the invention also comprises a fuel cell implementing the said method.

Other characteristics and advantages of the invention will become apparent from the following description given by way of a purely illustrative example, having no limiting character, with reference to the accompanying drawings and diagrams, in which:

FIG. 2 shows a diagram giving, as a function of the proportion of formate formed in the battery, the ratio between the relative dimensions of the power section of the battery and of the decarbonation section, and FIG. 3 shows a diagram giving, as a function of the quantity of formate formed in the battery, the quantity of formate to be injected.

Figure 1:
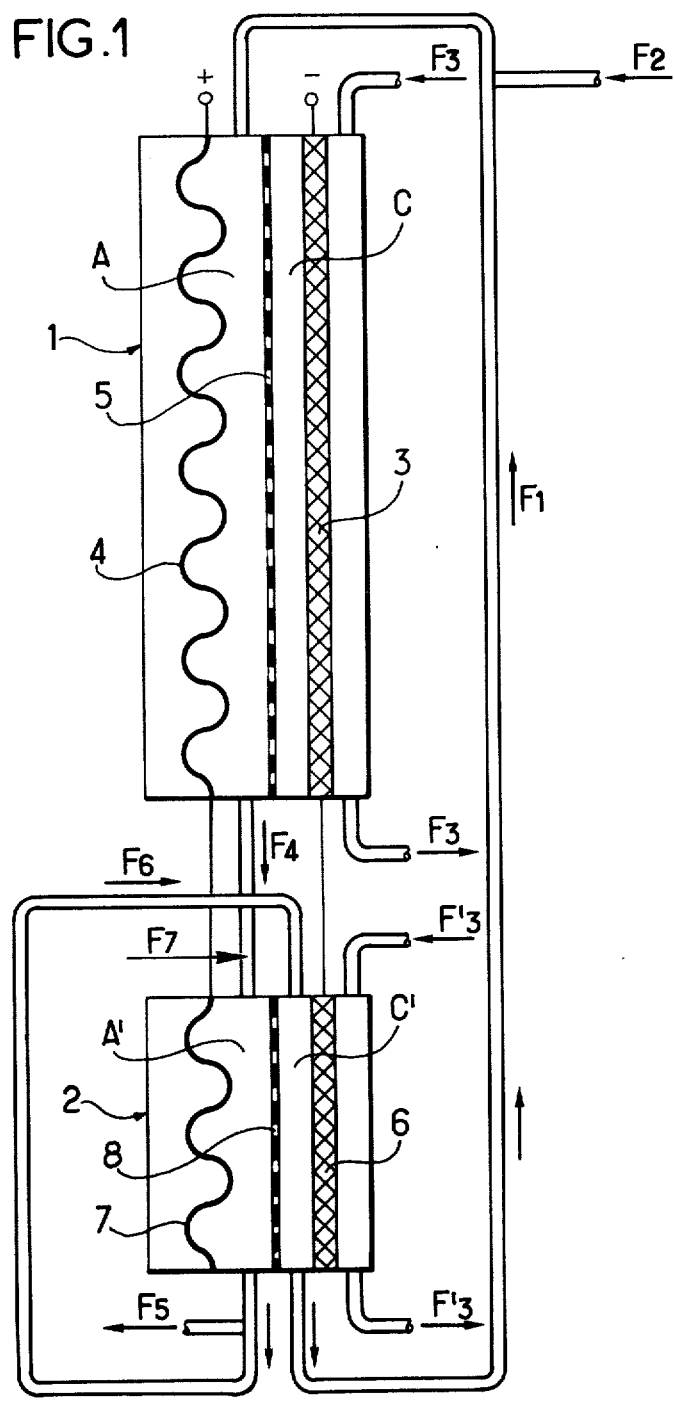
FIG. 1 shows diagrammatically a fuel cell having a decarbonation cycle, consuming a carbonaceous fuel according to the invention.

Thus, FIG. 1 shows very diagrammatically an element of a fuel cell formed in two portions, a portion 1 called the power section and a portion 2 called the electrolyte decarbonation section or, more simply, the "decarbonator."

Portion 1 comprises a cathode 3 and an anode 4, such electrodes comprising respectively specific catalysts suitable for favouring the reaction process. Separator 5 delimits an anode compartment A as well as a cathode compartment C.

Anode compartment A is fed with a potassium hydroxide solution in the direction of arrow F1 and with methanol injected in the direction of F2, whereas the cathode compartment C is fed with air in the direction of arrows F3.

Portion 2, the decarbonator, also comprises a cathode 6, as well as an anode 7 separated by a membrane 8 limiting an anode compartment A', as well as a cathode compartment C'.

Cathode 6 is fed with air in the direction of arrows F3'.

Anode compartment A' receives, in the direction of arrow F4, carbonated electrolyte coming from portion 1 of the battery. That decarbonated electrolyte leaves compartment A', the carbon dioxide being separated in the direction of arrow F5 and then injected into cathode compartment C', in the direction of arrow F6, where it is regenerated.

It is then recycled towards compartment A of portion 1 of the battery, in the direction of arrow F1.

The reaction processes taking place in such a fuel cell will now be set forth in detail.

In portion 1 of the battery, the oxidation of the methanol by air in an alkaline environment leads to formation of carbonate on the one hand and of formate on the other hand, according to the following reactions:

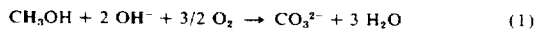

$$CH_3OH + 2 OH^- + 3/2 O_2 \rightarrow CO_3^{2-} + 3 H_2O \qquad (1)$$

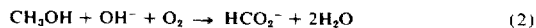

$$CH_3OH + OH^- + O_2 \rightarrow HCO_2^- + 2H_2O \qquad (2)$$

The relative proportions of carbonate and of formate depend on a certain number of factors such as, more particularly, the nature of the electrode catalysts, the temperature, the concentration of the electrolyte, the density of the current and others.

Moreover, it is known that oxidation of formate ions in a buffered alkaline environment such as effected in the electrolyte provided in the battery is easier than that of the methanol on account of its oxido-reducing potential which is more electro-negative, whence it may be seen that less expensive catalysts than in the case of the oxidising of the methanol may be used.

We have, therefore, thought of using the formate produced in portion 1 of the battery to produce, at least partly, in compartment A' of decarbonator 2, the decarbonation of the electrolyte and, moreover, if the quantity of formate thus produced is not sufficient, of injecting, at the input of the said compartment A', formic acid or a formate substantially as illustrated at F7 in FIG. 1.

Such decarbonation results from the following reactions:

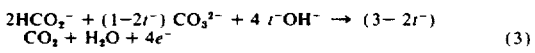

$$2HCO_2^- + (1-2t^-) CO_3^{2-} + 4 t^-OH^- \rightarrow (3-2t^-) CO_2 + H_2O + 4e^- \qquad (3)$$

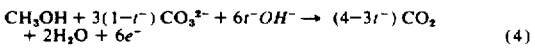

$$CH_3OH + 3(1-t^-) CO_3^{2-} + 6t^-OH^- \rightarrow (4-3t^-) CO_2 + 2H_2O + 6e^- \qquad (4)$$

Of course, the OH⁻ ions come from the cathode compartment C' by migration-diffusion through the membrane 8. The parameter $t^-$ which is the transport number of the OH⁻ ions represents the intensity of such a transfer and is, of course, related to the selectivity characteristics of the said membrane 8.

At the output of compartment A', the electrolyte is therefore rid of the CO₂ which is removed in the direction of F5. The electrolyte is discharged in the direction of F6 into the cathode compartment C', where it is regenerated according to the following reactions:

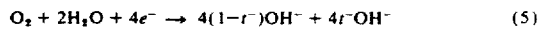

$$O_2 + 2H_2O + 4e^- \rightarrow 4(1-t^-)OH^- + 4t^-OH^- \qquad (5)$$

As previously stated, the electrolyte thus regenerated is then recycled towards compartment A of portion 1 and the cycle begins again.

Moreover, we have observed that according to the relative quantity of carbonate and of formate formed in portion 1 of the battery (reactions (1) and (2)), the ratio between the relative dimensions of portions 1 and 2 of the battery can be modified.

This may be observed from the diagram in FIG. 2, which shows:

As abscissa, the number X which is the ratio between the number of equivalents of formate and the total number of formate and carbonate equivalents formed in portion 1;

As ordinate, the ratio S1/S2 which is the ratio between the reaction surfaces of portions 1 and 2 of the battery, in other words, their relative dimensions, this being for various values of the transport number $t^-$, where $t^- = 0,1 \ldots 0,5$.

In practice, the membranes currently provided are such that $t^- = 0.2$. In that case, it will be seen that where X = 0.62, substantially, the maxium ratio S1/S2 is obtained.

Generally, such a diagram shows that the higher the value of $t^-$ is (in other words, the less the membrane 8 is selective), the more it is necessary to generate formate (reaction 1) in portion 1 of the battery.

Such a generation of formate may, however, prove to be difficult or even impossible; the result of this is that it is advantageous to inject formic acid in the direction of F7 (FIG. 1) in the electrolyte between portions 1 and 2 of the battery.

Such injection leads to the forming of HCO₂⁻ ions according to the reaction:

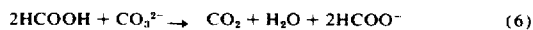

$$2HCOOH + CO_3^{2-} \rightarrow CO_2 + H_2O + 2HCOO^- \qquad (6)$$

Consider now, the diagram illustrated in FIG. 3, where the proportion T of formic acid is shown as a function of X and in relation to methanol to be injected in the direction of F7 (FIG. 1) so as to obtain a maximum ratio S1/S2, and also as a function of the transport number $t^-$ and hence of the selectivity of the membrane 8.

That diagram shows that the less formate portion 1 of the battery produces, the less selective its membrane 8 is, the more formate it is necessary to inject.

To give a clear idea, wher X = 0.2 and a membrane 8 such that $t^- = 0.2$, it will be seen that about 1 mole of formic acid for one mole of methanol will have to be injected to obtain a maximum ratio S1/S2.

To great advantage, such a mixture may be replaced by methyl formate having a lower price than the sum of the prices of formic acid and methanol which are assumed to be injected separately. Of course, in that case, the quantity of methanol injected in the direction F2 will be zero.

Besides the previously mentioned advantages, more particularly, the reduction of the dimensions of decarbonator 2 with respect to portion 1, called the power section, the at least partial replacement of methanol by formic acid or a formate makes it possible to improve the efficiency of the membrane 8, as well as the density of the current in the decarbonator.

Moreover, it is possible to use cheaper catalysts in that portion of the battery.

Consequently, such electrochemical cells have a cost price which is very much lower than that of batteries implementing the heretofore usual decarbonation cycles.

It must be understood that the invention is not limited to the embodiment described and illustrated, which has been given only by way of an example, and that variations and modifications may be made within the inventive concept.

We claim:

1. Method for decarbonation of an alkaline electrolyte of a fuel cell utilizing a carbonaceous fuel and an oxygen-containing oxidant, the electrolyte and fuel being supplied to the anode compartment of the power portion of the fuel cell and the oxidant being fed to the cathode compartment, separated from said anode compartment by a first membrane, of said fuel cell, the electrolyte being decarbonated during operation of the cell, said method comprising the steps of:

withdrawing electrolyte from said anode compartment for decarbonation;

adding to the electrolyte thus withdrawn a material containing formate ions;

passing the mixture of said electrolyte and said formate ion containing material successively through the anode and cathode compartments of a decarbonation portion of said fuel cell said anode compartment and said cathode compartment separated by a second membrane permitting passage of $OH^-$ ions, carbon dioxide being removed after passage of said mixture through said anode compartment and before passage into said cathode compartment, and returning the decarbonated electrolyte from said decarbonation portion of said fuel cell to said anode compartment of said power portion of said fuel cell, the amount of said formate ion containing material added to the electrolyte being such that the sum of the formate ion content of the withdrawn electrolyte resulting from the oxidation of said carbonaceous fuel and the formate ion content added as aforesaid to the electrolyte is sufficient to produce coomplete decarbonation of the electrolyte.

2. A method as defined in claim 1 in which said oxidant is air, said carbonaceous fuel is methanol and said alkaline electrolyte is potassium hydroxide solution.

3. A method as defined in claim 1 in which said sum of formate content is so maintained as to substantially minimize, for the selectivity characteristics of the particular membrane in use in said decarbonation portion, the decarbonation electrode surface requirement relative to the electrode surface of the fuel cell power portion.

4. A method as defined in claim 1 in which said formate ion containing material consists essentially of formic acid.

5. A method as defined in claim 1 in which said formate ion containing material contains at least one ester of formic acid.

6. A method as defined in claim 5 in which said formate ion containing material comprises methyl formate.

7. A method as defined in claim 6 in which said carbonaceous fuel is methanol and in which the methyl formate content of said formate ion containing material is such as to substantially dispense with the addition of methanol to said anode compartment of said power portion of said fuel cell for maintaining continuing operation of said fuel cell.

8. A fuel cell comprising a power portion and a decarbonation portion each having an anode compartment and a cathode compartment separated by a membrane;

means for circulating an oxygen-containing oxidant gas through the respective cathode compartments of said power portion and said decarbonator portion;

means for supplying an alkaline electrolyte solution and a carbonaceous fuel to the anode compartment of said power portion;

means for removing carbonated electrolyte from said anode compartment of said power portion;

means for adding a formate ion containing material to said carbonated electrolyte and thereafter supplying said carbonated electrolyte and said formate ion containing material to the anode compartment of said decarbonator portion;

means for removing electrolyte from the anode compartment of said decarbonator portion and supplying it to the cathode compartment of said decarbonator portion;

means for venting carbon dioxide from said electrolyte after passage through the anode compartment of said decarbonator portion; and means for removing decarbonated electrolyte from the cathode compartment of said decarbonator portion and returning it to said means for supplying electrolyte to the anode portion of said power portion of said fuel cell.

* * * * *